United States Patent
Munshi et al.

(10) Patent No.: US 9,596,219 B2
(45) Date of Patent: *Mar. 14, 2017

(54) METHOD OF TRANSMISSION OF ENCRYPTED DOCUMENTS

(71) Applicant: Amaani, LLC, Sugar Land, TX (US)

(72) Inventors: Amaani Munshi, Sugar Land, TX (US); Imtiaz Munshi, Sugar Land, TX (US)

(73) Assignee: Amaani, LLC, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/327,413

(22) Filed: Jul. 9, 2014

(65) Prior Publication Data
US 2015/0052355 A1 Feb. 19, 2015

Related U.S. Application Data

(63) Continuation of application No. 13/088,414, filed on Apr. 17, 2011, now Pat. No. 8,806,190.

(60) Provisional application No. 61/325,792, filed on Apr. 19, 2010.

(51) Int. Cl.
*H04L 29/06* (2006.01)
*H04L 12/58* (2006.01)

(52) U.S. Cl.
CPC .......... *H04L 63/0428* (2013.01); *H04L 51/08* (2013.01); *H04L 63/083* (2013.01); *H04L 63/205* (2013.01)

(58) Field of Classification Search
CPC ... H04L 63/0428; H04L 51/08; H04L 63/205; H04L 63/083
See application file for complete search history.

(56) References Cited

U.S. PATENT DOCUMENTS

| | | |
|---|---|---|
| 5,473,691 A | 12/1995 | Menezes |
| 5,621,894 A | 4/1997 | Menezes |
| 5,790,677 A | 8/1998 | Fox |
| 6,021,203 A | 2/2000 | Douceur |
| 6,061,792 A | 5/2000 | Simon |
| 6,697,944 B1 | 2/2004 | Jones |
| 6,836,795 B2 | 12/2004 | Soderberg |
| 6,868,403 B1 | 3/2005 | Wiser |
| 6,981,137 B2 | 12/2005 | Deo |
| 7,003,480 B2 | 2/2006 | Fox |

(Continued)

OTHER PUBLICATIONS

Office Action for U.S. Appl. No. 13/088,414, Oct. 7, 2015.
Office Action for U.S. Appl. No. 13/088,414, Feb. 23, 2013.

*Primary Examiner* — Morshed Mehedi
*Assistant Examiner* — Ayoub Alata
(74) *Attorney, Agent, or Firm* — Novel IP (57) ABSTRACT

The application discloses an improved method of transmitting encrypted emails by prompting the user to select at least one attachment for attaching with the email, prompting the user to select an encryption option from among several encryption options, causing an application to encrypt the selected attachment using the selected encryption option while retaining the original format of the attachments, attaching the encrypted attachment to the email, transmitting the email containing the encrypted attachment to at least one recipient address using the email application, and transmitting a second email containing at least one password to the recipient address using the email application.

15 Claims, 3 Drawing Sheets

(56) References Cited

U.S. PATENT DOCUMENTS

| | | |
|---|---|---|
| 7,047,411 B1 | 5/2006 | DeMello |
| 7,047,422 B2 | 5/2006 | Benaloh |
| 7,050,408 B2 | 5/2006 | Shen |
| 7,149,896 B1 | 12/2006 | Bahl |
| 7,178,163 B2 | 2/2007 | Reeves, Jr. |
| 7,191,248 B2 | 3/2007 | Chattopadhyay |
| 7,210,165 B2 | 4/2007 | Speare |
| 7,213,147 B2 | 5/2007 | Tuvell |
| 7,280,956 B2 | 10/2007 | Cross |
| 7,284,121 B2 | 10/2007 | Williams |
| 7,293,013 B1 | 11/2007 | Horvitz |
| 7,293,171 B2 | 11/2007 | Batthish |
| 7,293,239 B2 | 11/2007 | Gorbet |
| 7,299,349 B2 | 11/2007 | Cohen |
| 7,308,573 B2 | 12/2007 | Kostal |
| 7,317,974 B2 | 1/2008 | Luskin |
| 7,346,925 B2 | 3/2008 | Marcjan |
| 7,376,235 B2 | 5/2008 | Kuehnel |
| 7,376,975 B2 | 5/2008 | Lafornara |
| 7,383,382 B2 | 6/2008 | Powell |
| 7,392,547 B2 | 6/2008 | Cahill |
| 7,421,075 B2 | 9/2008 | Hassan |
| 7,430,599 B2 | 9/2008 | Mariani |
| 7,433,888 B2 | 10/2008 | Hunter |
| 7,436,965 B2 | 10/2008 | Sherman |
| 7,437,573 B2 | 10/2008 | Counts |
| 7,444,655 B2 | 10/2008 | Sardera |
| 7,444,669 B1 | 10/2008 | Bahl |
| 7,451,180 B2 | 11/2008 | Warren |
| 7,453,997 B2 | 11/2008 | Miller |
| 7,454,778 B2 | 11/2008 | Pearson |
| 7,461,170 B1 | 12/2008 | Taylor |
| 7,464,171 B2 | 12/2008 | Rambhia |
| 7,469,050 B2 | 12/2008 | Kouznetsov |
| 7,478,066 B2 | 1/2009 | Remington |
| 7,493,429 B2 | 2/2009 | Paff |
| 7,500,108 B2 | 3/2009 | Johnson |
| 7,512,798 B2 | 3/2009 | Cahill |
| 7,519,720 B2 | 4/2009 | Fishman |
| 7,523,310 B2 | 4/2009 | Narin |
| 7,529,937 B2 | 5/2009 | Tribble |
| 7,533,265 B2 | 5/2009 | Ballinger |
| 7,536,635 B2 | 5/2009 | Racovolis |
| 7,539,722 B2 | 5/2009 | Mohamed |
| 7,539,733 B2 | 5/2009 | Mohammed |
| 7,549,062 B2 | 6/2009 | Kouznetsov |
| 7,558,851 B2 | 7/2009 | Bahl |
| 7,571,150 B2 | 8/2009 | Raghavan |
| 7,571,319 B2 | 8/2009 | Gillum |
| 7,571,322 B2 | 8/2009 | Karoubi |
| 7,580,526 B2 | 8/2009 | England |
| 7,584,241 B2 | 9/2009 | Kureshy |
| 7,584,362 B2 | 9/2009 | Paya |
| 7,591,012 B2 | 9/2009 | Jaganathan |
| 7,593,548 B2 | 9/2009 | Dharmarajan |
| 7,600,000 B2 | 10/2009 | Yao |
| 7,600,031 B2 | 10/2009 | Toutonghi |
| 7,603,425 B2 | 10/2009 | DiPlacido |
| 7,613,828 B2 | 11/2009 | Zintel |
| 7,617,510 B2 | 11/2009 | Zigmond |
| 7,620,685 B2 | 11/2009 | Marcjan |
| 7,627,759 B2 | 12/2009 | Langworthy |
| 7,636,939 B2 | 12/2009 | Kaler |
| 7,640,260 B2 | 12/2009 | Kaler |
| 7,657,932 B2 | 2/2010 | Ballinger |
| 7,676,812 B2 | 3/2010 | Cabrera |
| 7,690,045 B2 | 3/2010 | Ferguson |
| 7,716,288 B2 | 5/2010 | Graham |
| 7,716,379 B2 | 5/2010 | Ruan |
| 7,716,479 B2 | 5/2010 | Vargas |
| 7,716,699 B2 | 5/2010 | Evans |
| 7,720,935 B2 | 5/2010 | Anantha |
| 7,720,973 B2 | 5/2010 | Patiejunas |
| 7,730,138 B2 | 6/2010 | Ballinger |
| 7,739,500 B2 | 6/2010 | Cameron |
| 7,746,885 B2 | 6/2010 | Thompson, III |
| 7,770,001 B2 | 8/2010 | Milton |
| 7,770,165 B2 | 8/2010 | Olson |
| 7,788,227 B1 | 8/2010 | Nettleton |
| 7,792,121 B2 | 9/2010 | Thompson, III |
| 7,792,924 B2 | 9/2010 | Liu |
| 7,818,796 B2 | 10/2010 | Volpano |
| 7,849,303 B2 | 12/2010 | Miller |
| 7,873,959 B2 | 1/2011 | Zhu |
| 7,876,896 B2 | 1/2011 | Alkove |
| 7,900,260 B2 | 3/2011 | Hirst |
| 7,904,517 B2 | 3/2011 | Kang |
| 7,904,725 B2 | 3/2011 | Pavlicic |
| 7,925,693 B2 | 4/2011 | Swander |
| 7,937,753 B2 | 5/2011 | Hodges |
| 7,941,726 B2 | 5/2011 | Venkatesan |
| 7,949,758 B2 | 5/2011 | Kaler |
| 7,950,065 B2 | 5/2011 | Toutonghi |
| 7,984,497 B2 | 7/2011 | Carpenter |
| 8,001,189 B2 | 8/2011 | Nielsen |
| 8,005,901 B2 | 8/2011 | Ballinger |
| 8,051,488 B2 | 11/2011 | Kagle |
| 8,065,421 B2 | 11/2011 | Bansod |
| 8,081,756 B2 | 12/2011 | Fang |
| 8,088,011 B2 | 1/2012 | Russell |
| 8,095,977 B2 | 1/2012 | Mullor |
| 8,099,370 B2 | 1/2012 | Ohata |
| 8,112,444 B2 | 2/2012 | Schwartz |
| 8,117,094 B2 | 2/2012 | Multerer |
| 8,117,459 B2 | 2/2012 | Cameron |
| 8,136,166 B2 | 3/2012 | Dublish |
| 8,151,106 B2 | 4/2012 | Vargas |
| 8,151,118 B2 | 4/2012 | Foster |
| 8,156,330 B2 | 4/2012 | Yu |
| 8,170,591 B2 | 5/2012 | Gosset |
| 8,190,878 B2 | 5/2012 | Stern |
| 8,196,186 B2 | 6/2012 | Mityagin |
| 8,209,744 B2 | 6/2012 | Zhu |
| 8,261,322 B2 | 9/2012 | Larsen |
| 8,266,706 B2 | 9/2012 | Reid |
| 8,296,569 B2 | 10/2012 | Pestoni |
| 8,301,697 B2 | 10/2012 | Sethi |
| 8,301,879 B2 | 10/2012 | Ramanathan |
| 8,307,421 B2 | 11/2012 | Buch |
| 8,316,227 B2 | 11/2012 | Nolan |
| 8,332,907 B2 | 12/2012 | Canning |
| 8,341,410 B2 | 12/2012 | Shao |
| 8,375,437 B2 | 2/2013 | Linsley |
| 8,392,713 B2 | 3/2013 | Hughes |
| 8,411,863 B2 | 4/2013 | Ureche |
| 8,416,788 B2 | 4/2013 | Colville |
| 8,417,949 B2 | 4/2013 | Zhang |
| 8,424,105 B2 | 4/2013 | Flaks |
| 8,447,970 B2 | 5/2013 | Klein |
| 8,473,634 B2 | 6/2013 | Satagopan |
| 8,479,008 B2 | 7/2013 | Lin |
| 8,533,489 B2 | 9/2013 | Roeder |
| 8,612,482 B2 | 12/2013 | Kapadia |
| 8,625,552 B2 | 1/2014 | Gupta |
| 8,682,957 B2 | 3/2014 | Elson |
| 8,687,804 B2 | 4/2014 | Dillaway |
| 8,705,746 B2 | 4/2014 | Meijer |
| 8,707,366 B2 | 4/2014 | Wong |
| 8,718,042 B2 | 5/2014 | Strebel |
| 8,719,912 B2 | 5/2014 | Frey |
| 8,732,452 B2 | 5/2014 | Byrum |
| 8,752,158 B2 | 6/2014 | Bjones |
| 8,776,199 B2 | 7/2014 | Paya |
| 8,776,208 B2 | 7/2014 | Yariv |
| 8,793,185 B1 | 7/2014 | Hollier |
| 8,806,218 B2 | 8/2014 | Hatakeda |
| 8,806,590 B2 | 8/2014 | Salada |
| 8,806,618 B2 | 8/2014 | Livshits |
| 8,806,652 B2 | 8/2014 | Bjones |
| 8,818,993 B2 | 8/2014 | Boyd |
| 8,819,424 B2 | 8/2014 | Soulios |
| 8,819,451 B2 | 8/2014 | Lokam |
| 8,832,427 B2 | 9/2014 | Roeder |
| 8,843,758 B2 | 9/2014 | Dharmarajan |

(56) References Cited

U.S. PATENT DOCUMENTS

| | | |
|---|---|---|
| 8,874,930 B2 | 10/2014 | Chase |
| 8,887,297 B2 | 11/2014 | Reid |
| 8,887,298 B2 | 11/2014 | Reid |
| 8,924,714 B2 | 12/2014 | Hatlelid |
| 8,930,691 B2 | 1/2015 | Kamara |
| 8,948,382 B2 | 2/2015 | Hassan |
| 8,955,105 B2 | 2/2015 | Hudis |
| 2002/0111946 A1 | 8/2002 | Fallon |
| 2003/0188188 A1 | 10/2003 | Padmanabhan |
| 2003/0200175 A1 | 10/2003 | Wang |
| 2003/0226017 A1 | 12/2003 | Palekar |
| 2004/0003248 A1 | 1/2004 | Arkhipov |
| 2004/0039834 A1 | 2/2004 | Saunders |
| 2004/0098498 A1 | 5/2004 | Mitra |
| 2004/0168081 A1 | 8/2004 | Ladas |
| 2004/0176935 A1 | 9/2004 | Sproule |
| 2004/0210630 A1 | 10/2004 | Simonnet |
| 2004/0250087 A1 | 12/2004 | Ray |
| 2005/0086696 A1 | 4/2005 | Daniels |
| 2005/0120201 A1 | 6/2005 | Benaloh |
| 2005/0172117 A1 | 8/2005 | Aura |
| 2005/0187894 A1 | 8/2005 | Pletcher |
| 2005/0207614 A1 | 9/2005 | Schonberg |
| 2005/0289358 A1 | 12/2005 | Haselden |
| 2006/0059091 A1 | 3/2006 | Wang |
| 2006/0082582 A1 | 4/2006 | Schmieder |
| 2006/0085638 A1 | 4/2006 | Phillips |
| 2006/0149677 A1 | 7/2006 | Shahine |
| 2006/0179453 A1 | 8/2006 | Kadie |
| 2006/0227121 A1 | 10/2006 | Oliver |
| 2007/0002011 A1 | 1/2007 | Kurlander |
| 2007/0124578 A1 | 5/2007 | Paya |
| 2007/0297610 A1 | 12/2007 | Chen |
| 2008/0005281 A1 | 1/2008 | Hsueh |
| 2008/0022097 A1 | 1/2008 | Gillum |
| 2008/0052509 A1 | 2/2008 | Ahmed |
| 2008/0133791 A1 | 6/2008 | Hodges |
| 2008/0183624 A1 | 7/2008 | Grigorovitch |
| 2008/0235513 A1 | 9/2008 | Foster |
| 2008/0235807 A1 | 9/2008 | Cross |
| 2008/0263162 A1 | 10/2008 | Staiman |
| 2009/0006851 A1 | 1/2009 | Freeman |
| 2009/0092253 A1 | 4/2009 | Asipov |
| 2009/0177751 A1* | 7/2009 | Ito et al. ................ 709/206 |
| 2009/0214036 A1 | 8/2009 | Shen |
| 2009/0313111 A1 | 12/2009 | Westerinen |
| 2010/0071052 A1 | 3/2010 | Mao |
| 2010/0082974 A1 | 4/2010 | Sheth |
| 2010/0100743 A1 | 4/2010 | Ali |
| 2010/0161961 A1 | 6/2010 | Beigelman |
| 2010/0180332 A1 | 7/2010 | Ben-Yochanan |
| 2010/0191549 A1 | 7/2010 | Toyama |
| 2010/0306221 A1 | 12/2010 | Lokam |
| 2010/0306554 A1 | 12/2010 | Nunez-Tejerina |
| 2010/0318782 A1 | 12/2010 | Auradkar |
| 2011/0219424 A1 | 9/2011 | Panasyuk |
| 2012/0016903 A1 | 1/2012 | Dunn |
| 2012/0036358 A1* | 2/2012 | Johnson et al. ............ 713/168 |
| 2012/0144198 A1 | 6/2012 | Har |
| 2012/0144201 A1 | 6/2012 | Anantha |
| 2012/0221945 A1 | 8/2012 | Dukhon |
| 2013/0083698 A1 | 4/2013 | Abhishek |
| 2013/0124756 A1 | 5/2013 | Voronel |
| 2013/0169736 A1 | 7/2013 | Lindblom |
| 2013/0202097 A1 | 8/2013 | Schultz |
| 2013/0203383 A1 | 8/2013 | Stopel |
| 2013/0227657 A1 | 8/2013 | DAurelio |
| 2013/0254829 A1 | 9/2013 | Jakubowski |
| 2013/0268685 A1 | 10/2013 | Schmieder |
| 2014/0156631 A1 | 6/2014 | Salvetti |
| 2014/0157422 A1 | 6/2014 | Livshits |
| 2014/0215610 A1 | 7/2014 | Lifliand |
| 2014/0279844 A1 | 9/2014 | Shukla |
| 2014/0286492 A1 | 9/2014 | Vasudevan |
| 2014/0313879 A1 | 10/2014 | Hiie |
| 2014/0359785 A1 | 12/2014 | Chandra |
| 2015/0007317 A1 | 1/2015 | Jain |
| 2015/0245277 A1 | 8/2015 | Hassan |
| 2015/0271028 A1 | 9/2015 | Li |

* cited by examiner

METHOD OF TRANSMISSION OF ENCRYPTED DOCUMENTS

CROSS-REFERENCE

The present application relies on U.S. patent application Ser. No. 13/088,414, of the same title and filed on Apr. 17, 2011, which in turn relies on U.S. Provisional Application No. 61/325,792, filed on Apr. 19, 2010, for priority, both of which are hereby incorporated herein by reference.

FIELD OF THE INVENTION

The present specification is directed to enabling improved methods and systems for emailing encrypted attachments using, for example, an email application or any software application conforming to one or more email protocols. More specifically, embodiments of the present specification are designed to help service professionals comply with certain privacy requirements, or best practices standards, with respect to client communications.

BACKGROUND OF THE INVENTION

Conventionally, attachments, such as Microsoft Word®, Microsoft Powerpoint®, Microsoft Excel®, text, images, spreadsheets, presentations, or other documents, are securely transmitted via an email application, such as Microsoft Outlook®, using one of two methods.

The first method relies on an encryption program integrated with the email application itself. Conventionally, a user initiates an email program, creates an email, associates an attachment with the email, and causes the email program to transmit the email, with the associated attachment, to an intended recipient. Prior to transmission, the encryption program integrated with the email application encrypts the email, along with the attachment, and sends the encrypted email to the intended recipient. To access the encrypted email, the intended recipient must have a key, associated with the email sender that enables the decryption of the encrypted email. This method has several disadvantages. First, although it permits a user to encrypt an email transmission efficiently, it requires the recipient to have the same encryption program integrated with the email application. Second, the encryption of the third party or integrated encryption program may be less effective than using the encryption feature of the application which the user used to originally create the attachment. Third, once the email is decrypted, the attachment can be saved and is no longer subject to encryption, leaving the attachment unprotected at the recipient's computer.

In another available encryption method an attachment is converted from its original format into an encrypted PDF file before transmission. However, this prevents a recipient from directly editing the data contained in the attachment, and as a result, also inhibits efficient collaboration between users.

The second method uses the encryption feature of the application which the user used to originally create the attachment, but is far more time consuming. Here, a user first encrypts the attachment using the originating application and assigns the encrypted attachment a password. The password, if pre-stored, has to be retrieved from yet another application. The user then opens the email program, creates an email, associates an encrypted attachment with the email, and causes the email program to transmit the email, with the associated encrypted attachment, to an intended recipient. The user then prepares and sends a subsequent email containing the password to open the encrypted attachment to the intended recipient. This method, while addressing some of the deficiencies cited above, is cumbersome and requires the user to separately encrypt an attachment in one application and compose multiple emails. In addition, this process is manual and is thus prone to data entry errors (i.e. possibility of a mistyped password in a subsequent e-mail), "lost" or "forgotten" password errors, in which case even the sender may not be able to open the encrypted document.

It would be desirable to enable an encryption system that a) enables a user to send encrypted attachments rapidly and efficiently, b) uses the built-in encryption feature of applications used to create attachments, and also retains the original format of the attachments, c) does not require a user to prepare multiple emails, d) does not require the recipient to have the specific encryption program utilized by the sender, and e) eliminates the possibility of "lost" or "forgotten" passwords rendering the original document inaccessible.

SUMMARY OF THE INVENTION

In an embodiment, the present invention provides a method for transmission of encrypted email attachments by using an email application.

In one embodiment, the present invention provides a method for transmitting encrypted email attachments using an email application, the method comprising the steps of a) generating an interface that accepts, from a user, an input designating a file to attach to an email; b) generating an interface that accepts, from a user, an input designating an encryption option from among a plurality of encryption options; c) based upon said input designating an encryption option, causing an application to encrypt the designated file; d) attaching the encrypted file to the email; e) transmitting the email and the encrypted file attached thereto to at least one recipient email address using the email application; and f) automatically transmitting a second email containing at least one password to the at least one recipient email address using the email application, wherein the password is adapted to be used to decrypt the encrypted attachment.

In one embodiment, the plurality of encryption options comprises an encryption option prompting the user to selectively protect one of a plurality of selected files. In another embodiment, the plurality of encryption options comprises an encryption option prompting the user to establish a specific password for encrypting and/or decrypting the designated file. In yet another embodiment, the plurality of encryption options comprises an encryption option prompting the user to set a predefined number of digits of the user's social security number as a password for encrypting and/or decrypting the designated file. In yet another embodiment, the plurality of encryption options comprise an encryption option prompting the user to set a password pre-assigned to a corresponding recipient address, wherein the password is adapted to be used for encrypting and/or decrypting the designated file. In still another embodiment, the plurality of encryption options comprise an encryption option prompting the user to set a randomly generated password for encrypting and/or decrypting the designated file.

In one embodiment, the user generates a list comprising a plurality of passwords and recipient addresses, wherein at least one password is assigned to each recipient address and wherein the list is used to select a password for encrypting and/or decrypting the designated file.

In one embodiment, the user is presented with an option of storing the encrypted designated file at a selected location.

In another embodiment, the step of attaching the encrypted attachment with the first, prepared email comprises adding a standard text to the email, the standard text conveying an encrypted status of the email attachment to a recipient.

In one embodiment, the second email comprises at least one password corresponding to each encrypted designated file. In one embodiment, transmitting the second email comprises prompting the user to delete one or more recipient addresses from the second email and wherein the second email requires at least one recipient address for successful transmission.

In one embodiment, the method of the present invention further comprises storing a log for maintaining an audit trail of each encrypted designated file, wherein the log comprises a name of the file, a location where the file is saved, a sender name, a recipient name, and one or more passwords with respect to each designated file.

In one embodiment, the method of the present invention further comprises encrypting said email and forming said encrypted email into an attachment that is transmitted with the first email message. In an embodiment, the method of the present invention further comprises encrypting said email and forming said encrypted email into an attachment that is transmitted with an automatically generated email message.

In another embodiment, the present invention is a method for transmitting an encrypted email using an email application, the method comprising the steps of a) a user opening an email program and composing an email message; b) generating an interface within the email program that presents encryption options to a user; c) accepting, from a user, an input designating that the content of the email message is converted into a predefined format; d) encrypting the email message using an application that corresponds to the predefined format; e) erasing the original text of the email message from the email body; f) attaching the encrypted email message to an automatically generated email message; g) transmitting the encrypted email message attachment along with the automatically generated email message; and h) generating an interface that presents the user with an option to compose and transmit a subsequent email with a password.

In another embodiment, the method further includes the step of composing and transmitting a subsequent email message with a password, which is used to decrypt the original email message. In yet another embodiment, the method further includes the step of composing and transmitting a subsequent email message with a password hint.

In yet another embodiment, the present invention is a method for transmitting an encrypted email and associated attachments using an email application, the method comprising the steps of: a) a user opening an email program and composing an email message; b) generating an interface that accepts, from a user, an input designating a file to attach to an email; c) generating an interface that accepts, from a user, an input designating an encryption option from among a plurality of encryption options; d) based upon said input designating an encryption option, causing an application to encrypt the designated file; e) generating an interface that accepts, from a user, an input designating that the content of the email message is converted into a predefined format, wherein the email message is encrypted using the application that corresponds to the predefined format and that original text of the email message is erased from the email body; f) attaching the encrypted email message and attached files to an automatically generated email message; g) transmitting the encrypted email message attachment and encrypted attachments along with the automatically generated email message to at least one recipient email address using the email application; and h) generating an interface that presents the user with an option to compose and transmit a subsequent email with a password.

In another embodiment, the method further includes the step of composing and transmitting a subsequent email message with a password, which is used to decrypt the original email message. In yet another embodiment, the method further includes the step of composing and transmitting a subsequent email message with a password hint.

The aforementioned and other embodiments of the present shall be described in greater depth in the drawings and detailed description provided below.

BRIEF DESCRIPTION OF THE DRAWINGS

These and other features and advantages of the present invention will be appreciated, as they become better understood by reference to the following detailed description when considered in connection with the accompanying drawings, wherein.

DETAILED DESCRIPTION OF THE DRAWINGS

The present invention is directed to enabling improved methods and systems for emailing encrypted emails and/or attachments using, for example, an email application or any software application conforming to one or more email protocols. More specifically, embodiments of the present invention are designed to service professionals comply with certain privacy requirements, or best practices standards, with respect to client communications. In one embodiment, the present invention is directed towards enabling improved methods and systems for emailing encrypted emails and attachments by certified public accountants (CPAs) to help CPAs comply with certain recommendations of "Generally Accepted Privacy Principles" promulgated by the American Institute of Public Accountants and to service legal professionals who need a convenient method of encrypting attachments to email.

More particularly, the present invention is directed towards an email platform. The platform enables users to transmit e-mails in the form of encrypted attachments and/or encrypted attachments using an email application through a single, or limited number, of dialog boxes presented in the email application. The attachments are encrypted, without further user action, using the encryption feature of the application which created the attachment.

The present invention is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

One of ordinary skill in the art would appreciate that the methods described herein are effectuated by software application or programmatic instructions stored on a computer readable medium and executed by at least one processor. The computing device comprising the computer readable medium and processor can be any type of communication device, including a computer, server, mobile phone, gateway, laptop, desktop computer, netbook, personal data assistant, or any other device capable of accessing a cellular, Internet, TCP/IP, Ethernet, Bluetooth, wired, or wireless network. While the programmatic instructions enabling the processes described herein can be programmed using any programming language, in one embodiment, the Java or C++ programming language is used.

Figure 1A:
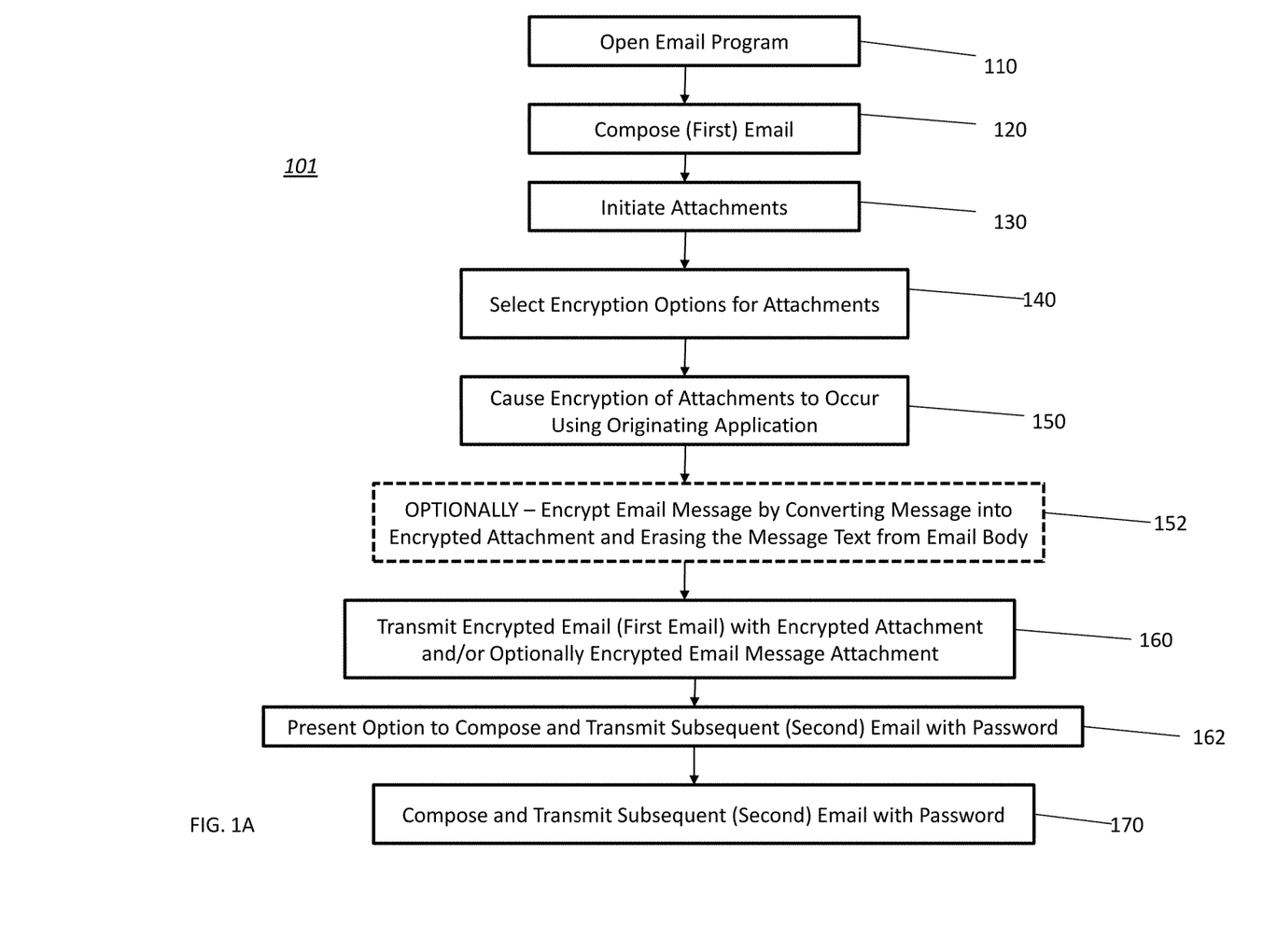
FIG. 1A is a flow diagram illustrating a method for transmission of encrypted email attachments, in accordance with an embodiment of the present invention.

FIG. 1A is a flow diagram illustrating a method for transmission of encrypted email attachments, in accordance with an embodiment of the present invention. Referring to FIG. 1A, a process flow 101 defining the actions caused by execution of a plurality of programmatic instructions is provided. In one embodiment, an email application, such as Microsoft Outlook®, is initiated or opened by a user at step 110. Using conventional means, a user creates or composes a first email at step 120. In step 130, the user indicates to the email program that an attachment needs to be associated with the first email.

In one embodiment, the application proactively informs a user of the option of attaching a file using the software functionality described herein. For example, the application displays a message informing the user "Remember to use the automatic password protection service if you wish to encrypt your attachments". In one embodiment, this message appears once, even if the user has multiple files to attach to the first email. In another embodiment, a user indicates to the email program a desire to activate the automatic password protection service described herein using an icon, button, menu option, or other display element integrated into the email program.

If a user so selects, the email application presents, in one or more dialog boxes, a plurality of encryption options at step 140, one of which includes setting a specific password for the decryption of the attachment. In one embodiment, the application proactively offers a user the option to use the last 4 digits of the client's social security number or Employer ID number as the password. After the user selects one or more options, including setting a specific password for the decryption of the attachment, the email application causes a third party application, specifically the application which originated the attachment, such as Microsoft Word®, Microsoft Excel®, Microsoft Powerpoint®, or any other presentation, word processing, PDF file creating, accounting, database, CAD file creating, image creating or spreadsheet applications, to encrypt the attachment 150 using the encryption feature of that application in accordance with the options selected by the user.

In one embodiment, the application provides an option to the user of encrypting the body of the email along with the attachments. In step 152, and as described with respect to FIG. 1B below (steps 135, 145, and 155), the email message itself is optionally encrypted by converting the e-mail message into an encrypted attachment and attaching the email attachment to an automated message along with the other attachments.

Once encrypted, the attachment(s) is/are associated with either the first unencrypted email or an automatically generated message (if the first email is converted into an encrypted attachment) and transmitted by the email application at step 160. Thus, in one embodiment, the e-mail is an automated message if the original e-mail message is encrypted. In another embodiment, the e-mail is the original message from user to recipient.

The email application then presents an option at step 162 to automatically compose (or create) a second, subsequent email providing the recipient with a password needed to decrypt the encrypted attachment(s) at step 170. In one embodiment, the second, subsequent email contains a message that provides the recipient with a password hint (i.e. "your password is the last four digits of your SSN"). One of ordinary skill in the art should appreciate that the transmission of the decrypting password can be sent before or after the transmission of the email with encrypted attachment.

Figure 1B:
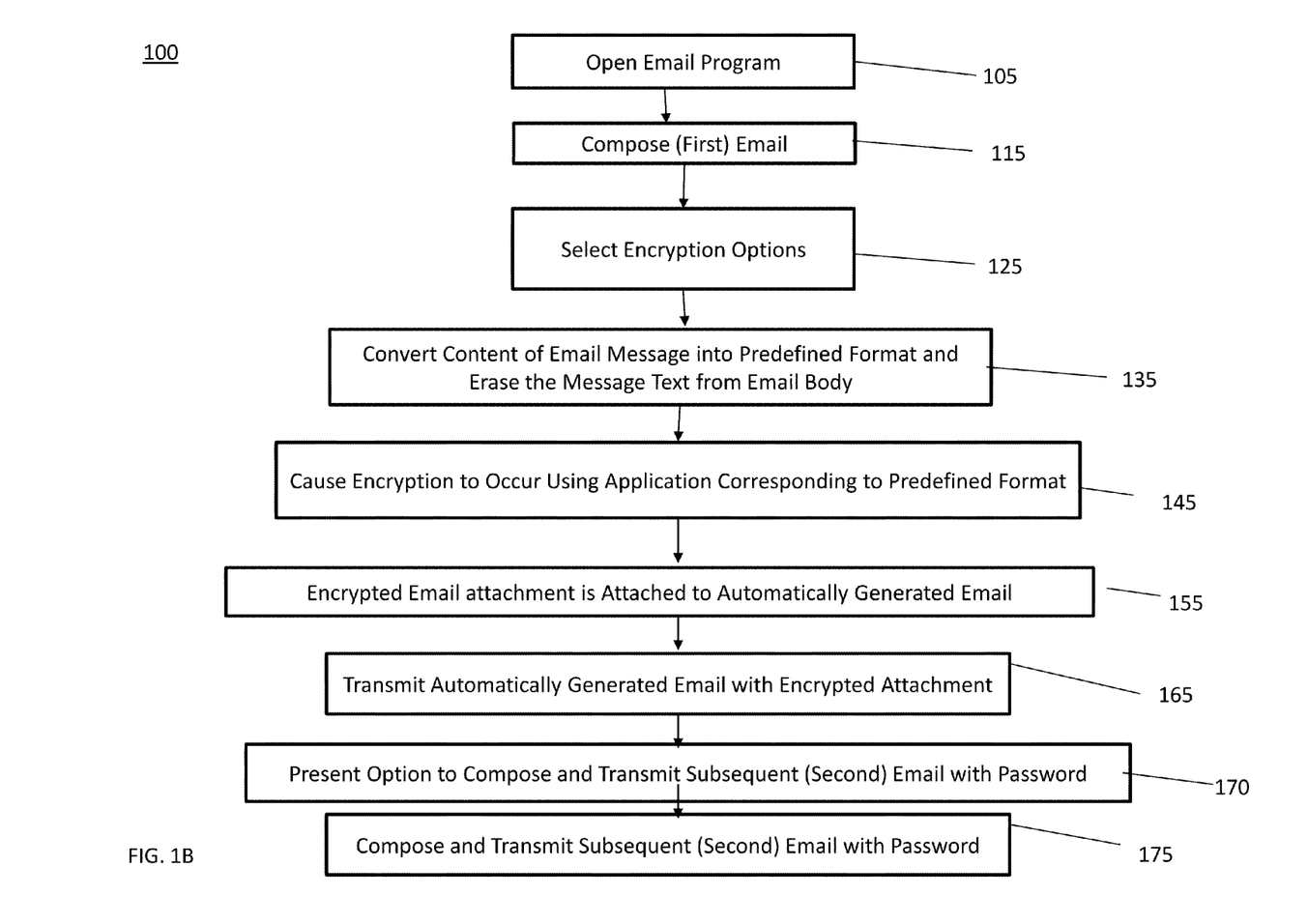
FIG. 1B is a flow diagram illustrating a method for transmission of encrypted email messages, in accordance with an embodiment of the present invention.

FIG. 1B is a flow diagram illustrating a method for the transmission of an email message as an encrypted attachment, in accordance with an embodiment of the present invention. Referring to FIG. 1B, a process flow 100 defining the actions caused by execution of a plurality of programmatic instructions, in accordance with an embodiment of the present invention, is provided. In one embodiment, an email application, such as Microsoft Outlook®, is initiated or opened by a user at step 105.

Using conventional means, a user initiates the creation of a first email at step 115. In one embodiment, the application proactively informs a user of the option of encrypting the first email and converting the first email message into an encrypted attachment and associated automatically generated e-mail message using the software functionality described herein. The first email message may be converted into a predefined format such as a Microsoft Word® file or a PDF file before encryption and attachment. In one embodiment, a user may be asked to choose a format for encrypting the email out of a list of predefined formats. For example, the application displays a message informing the user "The email will be converted to a Word file before encryption and would be sent to the recipient as an attachment to an automated mail message".

In one embodiment, a user indicates to the email program a desire to activate the automatic password protection service described herein using an icon, button, or other display element integrated into the email program. If a user so selects, the email application presents, in one or more dialog boxes, a plurality of encryption options at step 125, one of which includes setting a specific password for the decryption of the email. In one embodiment, the application proactively offers a user the option to use the last 4 digits of the recipient's social security number or Employer ID number as the password. After the user selects one or more encryption options, including setting a specific password for the decryption of the first email, the email application converts the contents of the first email into a predefined format such as a Microsoft Word® file or a PDF file and deletes the message from the email body at step 135 and causes the respective third party application i.e. Microsoft Word®, or PDF file creating application, to encrypt the converted first email at step 145 using the encryption feature of that application in accordance with the options selected by the user.

The encrypted first email is then attached to an automatically generated email at step 155 wherein the address of recipients are the same as those entered by the user in the first email before encryption. In one embodiment, the subject of the automatically generated email is the same as that entered by the user in the original email before encryption. Also, in one embodiment, the body of the automatically generated email contains predefined text such as 'Please see attached encrypted file for obtaining content of this email'. The automatically generated email containing the encrypted attachment is then transmitted by the email application at step 165. The email application then presents an option at step 170 to automatically compose and transmit a second, subsequent email which provides the recipient with a password needed to decrypt the encrypted attachment at step 175. In one embodiment, the second, subsequent email contains a message that provides the recipient with a password hint (i.e. "your password is the last four digits of your SSN"). One of ordinary skill in the art should appreciate that the transmission of the decrypting password can be sent before or after the transmission of the email with encrypted attachment.

In one embodiment, it should be noted that once decrypted, the recipient can disassemble the email attachment and reincorporate it back into a reply email to include the original text.

Figure 2:
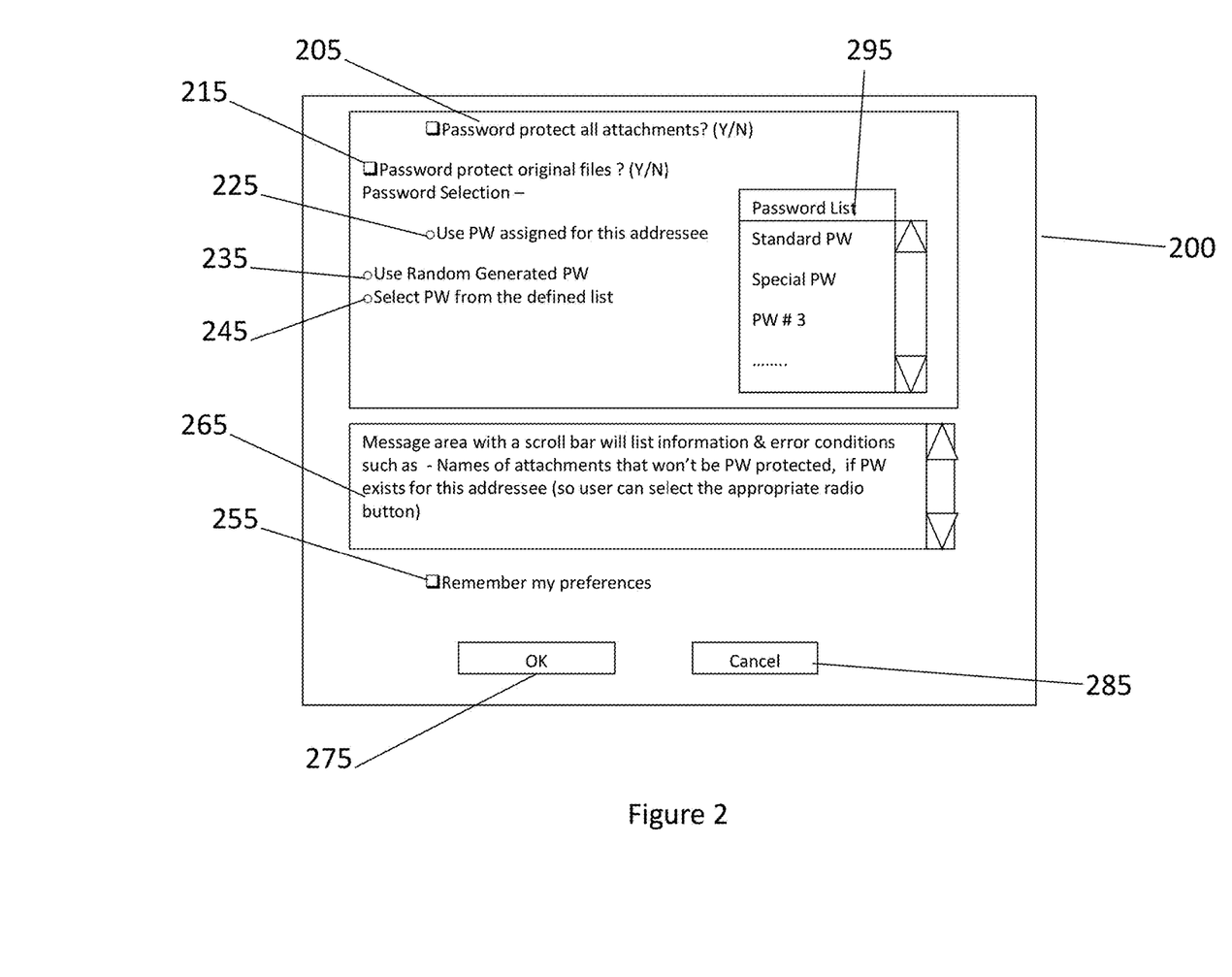
FIG. 2 illustrates an exemplary user interface, in accordance with an embodiment of the present invention.

FIG. 2 illustrates an exemplary user interface, in accordance with an embodiment of the present invention. Referring to FIG. 2, an exemplary dialog box 200 is presented. The dialog box, or user interface, is integrated into the email application and is automatically displayed each time a file is attached to an email or is initiated by clicking a button on the email application to call up the interface. It should be appreciated that the options described herein can be presented in one interface or dialog box or multiple interfaces/dialog boxes. In one embodiment, dialog box 200 comprises a plurality of encryption options, including an option to password protect all attachments 205, password protect original files 215, use a specific password already pre-assigned to the designated recipient 225, use a pre-designated password 245 selected from a list 295, use a randomly generated password 235, a message area 265 that describes information and error conditions, an option to remember preferences 255, a submit icon 275 (causes the email to be sent with or without encryption) and cancel icon 285 (causes no email to be sent). In one embodiment, the error conditions, such as no attachments, unsupported file types, or attachments that are already protected, are managed by the email application while the dialog box is open, thereby informing the user of errors in real-time.

The option to password protect all attachments provides users with an ability to selectively protect one or several of multiple attachments attached to an email. The option to use a specific password already pre-assigned to the designated recipient 225, use a pre-designated password 245 selected from a list 295, or use a randomly generated password 235 enables a user to conveniently manage multiple passwords that can be recipient specific. More specifically, in one embodiment, a user establishes a recipient password list, each customized to a specific recipient, thereby enabling recipients to conveniently access encrypted files using specialized, tailored passwords. In one embodiment, the application proactively offers a user the option to use a selection of digits, such as the last 4 digits, of the client's social security number or Employer ID number as the password. In another embodiment, a user can select an option to randomly generate a password 235 and then have that randomly generated password associated with the recipient or attachment in the password list 295. The interface displays the recipient's name in association with the predefined, randomly generated, or pre-assigned password.

In one embodiment, the present invention provides a user with the option to create and store a custom password list. Specifically, within a database structure, a password list can be formed and stored that relates a legal entity's name (such as an individual person, company, partnership, trust or other entity) with an email address and a social security number or FEIN, or a portion thereof. In one embodiment, the structure is stored in memory as a spreadsheet and then imported into the software program as required. In another embodiment, a list is generated using a native export feature in an email, address or contact program to create an excel (CSV or tab) file containing contacts, which, when exported, is properly formatted for use in the software of the present invention, including the addition of new columns for a social security number, FEIN, or custom password.

The password list preferably provides a user with the ability to assign at least one, and preferably two or more, passwords for each recipient, including a primary password and a secondary password. The primary password is typically the one used when communicating solely with the recipient, i.e. the first 4 digits of the social security number. The secondary password is typically used when the recipient is one of several recipients in an email and is typically a password shared by a group, such as a group of executives at a client company. Accordingly, the recipient may have zero, one, two, or more passwords assigned in the password list. In one embodiment, a user has the option to automatically assign passwords to clients made up of the last 4 digits of SSN or FEIN. In another embodiment, a user has the option to assign an alternate custom password up to 8 characters, instead of just 4 digits.

In one embodiment, when a new contact is added to an email program, the software will automatically ask if the contact is to be added to a password file or database structure. It should be appreciated that, in a network environment, the password file can reside on a local computer, only on a central server, or on both a local and remote computer.

In another embodiment, the custom password list can contain passwords for individuals that are not clients as well. It should further be appreciated that a user is not limited to using a contact list in the password file, therefore if a contact is not listed in the password file, a user will still be able to create a password (random or custom) for an individual contact. While this user-created password does not appear in the password file from the outset, it can be added subsequently by a user actively or through a periodic maintenance process that periodically updates the password file for any new contacts added. Further, the password can be added automatically or by user's consent via a prompt, to the existing password file at the time of creation.

It should be appreciated that, if no password protection is selected and a user selects "OK", the email will be sent without password protecting the attachments and in a conventional manner. Selecting checkbox 215 causes a password to be applied to the original files in the draft unsent email. In one embodiment, password selection area 295 is grayed out until the password protection option 205 is selected. In one embodiment, the application searches a database to relate a recipient name or email address to a stored password in relation to the recipient name or email address. In one embodiment, the pre-assigned recipient password is selected by default. In one embodiment, if there are multiple recipients, the software will offer to use the password assigned to the first recipient from the password file. If the first recipient does not appear in the password file, the user can proceed to create a new password.

The attachment can be saved in the email only, or in the original folder from where file was first retrieved, or in another folder on the user's computer (including a "new" folder), or in a data folder set up by the email application. A user can define the saving mode proactively or establish a default saving mode. The interface further enables an attachment to be saved by modifying a pre-established file name to add a predefined suffix, metadata, or file identifier, such as the words "AutoPW protected on XXXXXXXX (DATE)". Preferably, upon creation of the encrypted attachment or sending of the email with the encrypted attachment, a log is saved to local or remote memory. The log maintains an audit trail of files that were assigned passwords. The log would contain the file name, location where saved, sender name, recipient name, and password.

In one embodiment, a user performs some or all of the following steps to use the method of the present invention:

The user prepares an email and attaches one or more files;

The user presses a "send" icon;

An interface for establishing a plurality of encryption options is shown either automatically upon sending the email or by actively pressing a button;

The user activates an icon for "Password-protect my attachments" (if the user does not activate the password-protect icon, and "OK" is pressed, then an email is sent without password protection, and optionally in one embodiment after reconfirmation that the e-mail and the attachment(s) will not be protected/encrypted);

If the user activates an icon for "Password-protect my attachments", then an interface is displayed with icons for designating what kind of password would be used, e.g. custom passwords or random passwords;

The user designates what kind of password should be used;

An interface is displayed with check boxes next to a list of all the attachments and a header saying "Check the attachments to which you wish to assign the password";

If the file format for any password-selected attachment is not supported, the application will notify the user at the bottom of the attachment list in the message section;

If no attachment is found, the application will notify the user at the bottom of the attachment list in the message section by stating "If you forgot to attach a file, please press cancel, attach the missing file to your email message and start the application again.";

The user checks the boxes next to the attachments requiring protection;

If an attachment is already password protected, the application will notify the user at the bottom of the attachment list in the message section by stating "The following attachments were found to be previously encrypted. If you wish to password-protect these attachments using the application, you will need to un-encrypt these files prior to attaching them to your email."

The user presses OK to send the email with encrypted attachments;

The email application causes the third party application which originated the attachment to apply its internal encryption feature to encrypt the attachments;

The third party application causes the encrypted attachment to be saved in accordance with the user-selected options;

The email program then attaches the encrypted attachment to the email;

The email program then displays a message saying "Password assigned: XXXXXX (you may want to make a note of the password)";

The email program causes another message to be displayed, stating "Your attachments have been encrypted and saved to your email. Would you like to save the encrypted file on your computer?" The user is offered a checkbox for "Yes" and a checkbox for "No";

If user checks "No", then an interface is displayed stating "Press OK and return to the email application to send your email";

If user checks "Yes", then an interface is displayed providing a plurality of options, including saving file in the original folder from where file was first retrieved, saving the file in a default folder, or saving the file in another location. In one embodiment, when user checks one of the three boxes and presses OK, the files are saved in a conventional manner and optionally assigned the same file name as the original file with an added extension indicative of password protection;

Upon completion, the standard email application interface is displayed, which shows the body of the email, to which the user can then add or edit text and send the message when ready; in one embodiment, a standard paragraph is automatically added below the signature line explaining that the email attachment is encrypted in accordance with the firm's Privacy Policy, and referring to one or more guidelines, rules, or other standards with which the email complies.

The email application automatically generates a second email with the same subject as in the original email but preceded by a password notification, wherein the password is listed in the text of the email and the email is automatically sent to one or more of the email addresses that were included on the original email (including cc's and bcc's). In one embodiment, the user is prompted to delete any email addresses that user does not want to notify of the password. In one embodiment, the user has the option of pre-designating email recipients who should, and should not, receive the password; in one embodiment, a standard paragraph is automatically added below the signature line explaining that the email attachment is encrypted in accordance with the firm's Privacy Policy, and referring to one or more guidelines, rules, or other standards to which the email complies. In another embodiment, the user is prompted to change any email address (for example if the user wishes to send the password notification to an alternate email address belonging to the recipient for added security).

The user then causes the second email to be transmitted.

The system stores a log and maintains an audit trail of file attachments that were encrypted. The log would contain the file name, location where saved, sender name, recipient name, and passwords.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. A method of enabling a first application to generate an encrypted file using an encryption process native to a second application, the method comprising:
   within said first application, generating an interface that accepts, from a user, an input designating an encryption option from among a plurality of encryption options;
   within said first application, generating an interface that accepts, from the user, an input indicating at least one file, said at least one file having a format, to which the encryption process should be applied;
   within said first application, generating an interface that accepts, from the user, an input designating a file save option from among a plurality of file save options; and
   within said first application, causing a second application specific to said file format to apply said encryption process to said file, thereby causing data in said file to transform from an unencrypted state to an encrypted state, and saving the file in the encrypted state in accordance with the designated file save option, wherein the first application is an email application and wherein the second application is activated by the email application.

2. The method of claim 1, wherein the second application is at least one of a word processing, presentation, or spreadsheet application.

3. The method of claim 1, wherein the plurality of encryption options comprise an encryption option prompting the user to establish a specific password for encrypting and/or decrypting said at least one file.

4. The method of claim 1, wherein the plurality of encryption options comprise an encryption option prompting the user to set a predefined number of digits of a social security number as a password for encrypting and/or decrypting said at least one file.

5. The method of claim 1, wherein the plurality of encryption options comprise an encryption option prompting the user to set a pre-assigned password, wherein the password is adapted to be used for encrypting and/or decrypting said at least one file.

6. The method of claim 1, wherein the plurality of encryption options comprise an encryption option prompting the user to set a randomly generated password for encrypting and/or decrypting said at least one file.

7. The method of claim 1, wherein the plurality of file save options comprise a file save option enabling the user to save an encrypted copy of the at least one file in an original folder of the at least one file.

8. The method of claim 1, wherein the plurality of file save options comprise a file save option enabling the user to save an encrypted copy of the at least one file in a location designated by the user on a computer.

9. The method of claim 8, wherein, while saving the encrypted copy of the at least one file, a pre-established file name of said at least one file may be modified to add a predefined suffix, metadata, or file identifier.

10. A method of enabling a first application to generate an encrypted file using an encryption process native to a second application, the method comprising:
    within said first application, generating an interface that accepts, from a user, an input designating an encryption option from among a plurality of encryption options;
    within said first application, generating an interface that accepts, from the user, an input indicating at least one file to which the encryption process should be applied, wherein said at least one file has a format native to a second application; and
    within said first application, causing the second application to apply an encryption process to said file, thereby causing data in said file to transform from an unencrypted state to an encrypted state, wherein the first application is an email application and wherein the second application is activated by the email application.

11. The method of claim 10, wherein the second application is at least one of a word processing program, presentation program, or spreadsheet program.

12. The method of claim 10, wherein the plurality of encryption options comprise an encryption option prompting the user to establish a specific password for encrypting and/or decrypting said at least one file.

13. The method of claim 10, wherein the plurality of encryption options comprise an encryption option prompting the user to set a predefined number of digits of a social security number as a password for encrypting and/or decrypting said at least one file.

14. The method of claim 10, wherein the plurality of encryption options comprise an encryption option prompting the user to set a pre-assigned password, wherein the password is adapted to be used for encrypting and/or decrypting said at least one file.

15. The method of claim 10, wherein the plurality of encryption options comprise an encryption option prompting the user to set a randomly generated password for encrypting and/or decrypting said at least one.

* * * * *